May 27, 1958     T. J. SCHULTZ     2,836,656
ACOUSTIC WATTMETER

Filed Oct. 31, 1955     2 Sheets-Sheet 1

INVENTOR,
THEODORE J. SCHULTZ

BY W. R. Maltby
Louis I. Shrago

May 27, 1958     T. J. SCHULTZ     2,836,656
ACOUSTIC WATTMETER
Filed Oct. 31, 1955     2 Sheets-Sheet 2
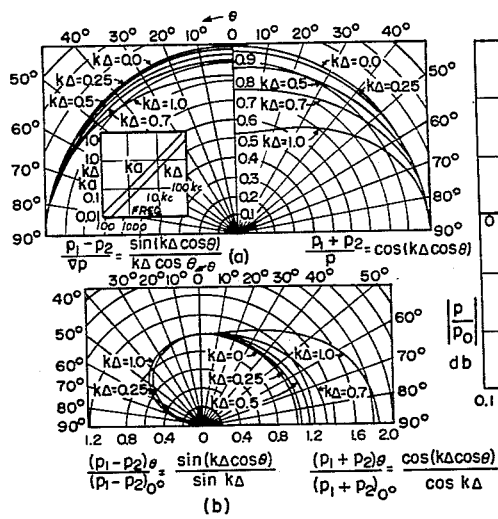
FIG. 7 BROADENING OF POLAR RESPONSE
FIG. 8 OBSTACLE EFFECTS AT CENTER OF RIGID CIRCULAR DISK VS $ka$
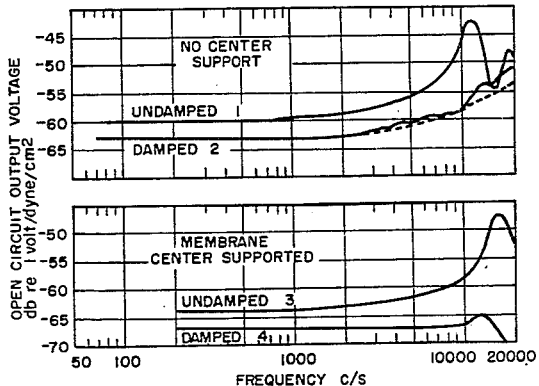
FIG. 9 VOLTAGE RESPONSE OF MICROPHONES VS FREQUENCY
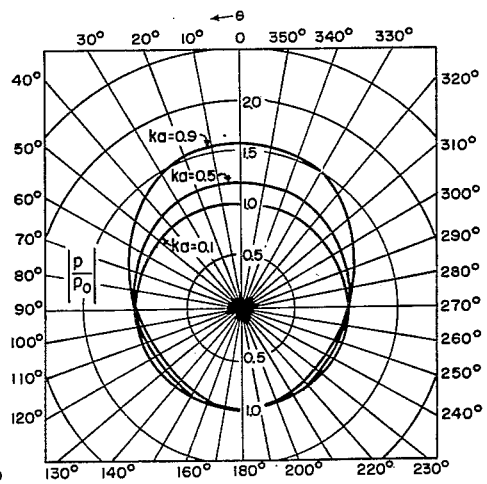
FIG. 10 $\left|\dfrac{p}{p_0}\right|$ VS ANGLE OF INCIDENCE
INVENTOR,
THEODORE J. SCHULTZ
BY 2,836,656
Patented May 27, 1958

2,836,656

ACOUSTIC WATTMETER

Theodore J. Schultz, Santa Monica, Calif., assignor to the United States of America as represented by the Secretary of the Navy Application October 31, 1955, Serial No. 544,098

3 Claims. (Cl. 179—1)

This invention pertains to a method and apparatus for measuring acoustic intensity and more particularly to a device which provides an indication of the averaged product of instantaneous pressure and particle velocity signals to combine thereby in its measurement of intensity the vector nature of the particle velocity and a recognition of the phase difference between pressure and particle velocity, as implied in the definition of acoustic intensity $$I_a = \frac{1}{T}\int_0^T p v_a dt \tag{1}$$

where $I_a$=the acoustic intensity in any specified direction $a$ of a sound field.
$T$=a time long compared to a period or an integral number of periods.
$p$=the instantaneous sound pressure.
$v_a$=the component of the instantaneous particle velocity in the direction $a$.

In this respect the device of this invention is analogous to the wattmeter in an electrical circuit which gives an indication of the averaged product of instantaneous voltage and current and for this reason the device has been termed an "acoustic wattmeter."

In the actively developing acoustic art, there is a long standing, acute need for a precise, direct reading, acoustic intensity measuring device. Not only is intensity a fundamental acoustical quality in terms of which others are defined, but there are intrinsically useful measurements to be made in terms of intensity which either cannot be made at all in terms of pressure or particle velocity alone, or which are so arduous and so uncertain in their final results as to be impractical.

Because the instrument of this invention indicates the averaged product of instantaneous pressure and particle velocity signals, it ignores simple standing wave systems in the sense that if such a system is considered as a superposition of two systems of energy transmission, one consisting of equal and opposite flows of energy, the other a net flow of energy, the instrument responds only to the net flow; and, regardless of space fluctuations of the pressure and particle velocity in the field, it yields the same reading at all points along the direction of propagation. This makes it possible to use the acoustic wattmeter to measure the absorption coefficients of materials in situ, to locate major radiating surfaces in noise studies, and to determine the degree of dispersion of sound within a room. Other uses for the acoustic wattmeter will readily occur to those skilled in the art. It is also noteworthy that the same device may be adapted to measure the specific acoustic impedance as a point function in space by an indication of the complex quotient of the pressure and particle velocity signals.

While there is no very great problem in getting an electrical signal proportional to the instantaneous acoustic pressure, it is extremely difficult to measure directly the particle velocity by electrical means or otherwise. This invention, therefore, derives a velocity signal from the pressure gradient in the sound wave in accordance with the following considerations: The hydrodynamic force equation, which embodies a statement of Newton's second law, relates the quantities of pressure gradient $\nabla p$ and particle velocity $q$ in the following manner:

$$P_0 \frac{dq}{dt} + \nabla p = 0$$

where $P_0$ is the density of the quiescent medium.

This implies that if a pressure gradient signal is available, it will be possible to integrate it in order to obtain the desired velocity signal. For this purpose we note in the realm of electrical circuits an analogous equation $$C\frac{dE}{dt} - i = 0$$

Thus, if the current $i$ through an ideal capacitor is made proportional to $\nabla p$, then the voltage $E$ across it will be proportional to $q$. The successful realization of the circuit will depend on the extent to which ideal electrical circuits can be practically approximated and it is well known that this is readily possible with high quality capacitors.

The embodiment of the invention disclosed herein relies on the exceptionally smooth response, both with respect to amplitude and phase, obtained from the condenser microphone described in applicant's copending application, Serial No. 534,413, filed September 14, 1955. Because two acoustic input signals from a pair of such condenser microphones enter as factors into a final product, it is necessary that phase and amplitude regularity and stability be closely controlled throughout the device. The present state of the electronics art makes it possible to satisfy these strict requirements with careful application of known design procedures to the amplifying equipment.

Both the pressure and pressure gradient are measured by combining signals from a pair of such condenser microphones separated in space by a small distance. The sum of the two signals from these condenser microphones represents the pressure while their difference is proportional to the pressure gradient, both referred to the same point midway between them.

For the accurate measurement of pressure gradient by this means, particularly at high frequencies, it is essential that the two condenser microphones be located quite close together. This in turn requires the units to be small and preferably that their geometry be such that the condenser microphones can be placed back to back. These requirements are met and the acoustic wattmeter made practical for the first time by the aforementioned condenser microphones.

There is, of course, some error involved in the use of the sum and difference of the pressures at two points to represent the pressure and pressure gradient at the point midway between them. This error can theoretically be made as small as desired by situating the points closer and closer together. There is a practical limit to how far one may go in this direction, however, not merely because of the physical size of the microphones but because the magnitude of the difference signal depends nearly linearly upon this spacing. The spacing may not be reduced too much lest the difference signal be lost in noise. The problem is to determine the greatest usable spacing consistent with an acceptable error.

Consider a pair of tiny pressure-sensitive microphones situated on the x-axis at positions $\pm \Delta$ from the origin and an arbitrary pressure wave travelling along the x-axis and represented by the Fourier integral $$p=\int_{-\infty}^{\infty} g(\omega)e^{i\omega(t-x/c)}d\omega$$

The pressures actuating the microphones will be (neglecting diffraction effects)

$$p_1=\int_{-\infty}^{\infty} g(\omega)e^{i\omega(t-\Delta/c)}d\omega$$

and $$p_2=\int_{-\infty}^{\infty} g(\omega)e^{i\omega(t+\Delta/c)}d\omega$$

The true pressure and pressure-gradient at the origin ($x=0$) will be $$p=\int_{-\infty}^{\infty} g(\omega)e^{i\omega t}d\omega \quad (2)$$

and $$\nabla p=\int_{-\infty}^{\infty} g(\omega)e^{i\omega t}(-j\omega/c)d\omega \quad (3)$$

Since we are concerned only that the sum and difference be proportional to $p$ and $\nabla p$, we may introduce the arbitrary constants A and B in comparing these expressions. The sum and difference signals then are $$A(p_1+p_2)=A\int_{-\infty}^{\infty} g(\omega)e^{i\omega t}(e^{-i\omega\Delta/c}+e^{i\omega\Delta/c})d\omega$$

and $$B(p_1-p_2)=B\int_{-\infty}^{\infty} g(\omega)e^{i\omega t}(e^{-i\omega\Delta/c}-e^{i\omega\Delta/c})d\omega$$

or $$A(p_1+p_2)=\int_{-\infty}^{\infty} g(\omega)e^{i\omega t}[2A\cos(\omega\Delta/c)]d\omega \quad (4)$$

$$B(p_1-p_2)=\int_{-\infty}^{\infty} g(\omega)e^{i\omega t}[-2B\sin(\omega\Delta/c)]d\omega \quad (5)$$

Comparing Equation (4) with (2) and Equation (5) with (3), it is seen that the sum and difference are good approximations to $p$ and $\nabla p$ to the extent that $$2A\cos(\omega\Delta/c)=1$$

and $$-2B\sin(\omega\Delta/c)=-j\omega/c$$

If we set $A=1/2$ and $B=j/2\Delta$, the question reduces to the familiar one of the error incurred by using $\cos x=1$ and $\sin x=x$ for small values of $x$:

$$\cos(\omega\Delta/c)=1 \quad (6)$$
$$\sin(\omega\Delta/c)=\omega\Delta/c$$

(see Fig. 4).

Within the limits of this approximation, the difference signal is proportional to the distance separating the microphones, as was mentioned above.

For example, arbitrarily choosing as the worst condition to be met a sinusoidal wave form with an upper limiting frequency of 10 kc./s., ($\omega/c=4.65$), a $\Delta$ of 0.055" will make $\omega\Delta/c=0.256$ and give a 1 percent ($<0.1$ db) difference between $(p_1-p_2)$ and $\nabla p$, and a 3 percent ($<0.25$ db) difference between $(p_1+p_2)$ and $p$. We conclude that if the pressure elements are to be mounted back to back, the diaphragms may be separated by at least 0.110" (i. e., $2\Delta$) without exceeding this surely tolerable error, so long as the pressure wave contains no important components above 10 kc./s., and if the entire unit is so small that we may legitimately ignore diffraction effects (a question to be discussed shortly).

At lower frequencies the error will be less than this and it should be noted that the error is one of amplitude only and not of phase. In all cases both $(p_1+p_2)$ and $(p_1-p_2)$ err on the low side. We will see the usefulness of this fact later.

Oblique incidence and pressure-gradient

The success of the $\nabla p$ measurement was seen to depend on the fixed distance $2\Delta$ between the two microphone diaphragms. In the case of sound waves arriving at other than normal incidence, then, the effective distance between diaphragms will change and there may be difficulty. Consider the arrangement of Fig. 5 in which the rectangle represents an edge view of the double microphone with sensitive diaphragms on top and bottom. The sound wave is incident upon the face of one of the microphones at an angle $\theta$; the diaphragm of the other microphone is situated parallel to the first at a distance $2\Delta$ behind it. Again we neglect the effects of diffraction.

Each pressure element will register an average of the pressures symmetrical about its center and hence will reflect the phase of the pressure wave at this central point. This may be seen by considering the phase of the sum of pairs of pressure increments contributed by equal areas symmetrical about the diameter normal to the direction of propagation. (See Fig. 6).

The pressure $x_a$ and $x_b$ are, say (choosing the reference point at the origin)

$$p_a=P\cos(\omega t+\Phi)=P(\cos\omega t\cos\Phi-\sin\omega t\sin\Phi)$$

and $$p_b=P\cos(\omega t-\Phi)=P(\cos\omega t\cos\Phi+\sin\omega t\sin\Phi)$$

where $$\Phi=\frac{\omega}{c}x_a\cos\theta=\frac{\omega}{c}x_b\cos\theta$$

and where it is assumed that the source is so far distant that the pressure amplitudes at $x_a$ and $x_b$ are equal. The pressures $p_a$ and $p_b$ acting on equal areas contribute equal increments to the pressure integral $$p_a+p_b=(2P\cos\phi)\cos\omega t$$

and this has the phase of the pressure at the center of the diaphragm ($x=0$).

But the center points of the diaphragms are separated by a distance $2\Delta\cos\theta$ in the direction of propagation of the wave, and this gives precisely the cosine dependence upon the angle of incidence which is characteristic of the pressure gradient.

Incidentally this yields a sensitive method for deciding whether or not the criteria of Equation (6) are satisfied. For we can now modify Equations (4) and (5) to account for the change in separation distance as a function of $\theta$; this gives $$p_1+p_2\alpha\cos(k\Delta\cos\theta)$$
$$p_1-p_2\alpha\sin(k\Delta\cos\theta), \text{ where } k=\omega/c$$

Here it is evident that as $\theta$ increases from 0 to $\pi/2$ and $\cos\theta$ decreases from 1 to 0, reducing the arguments of the sine and cosine functions, the approximation of Equation (6), rapidly improves and we see that the accuracy of the instrument increases at oblique incidence. We can show this by comparing the sum-and-difference signals for oblique incidence with those for true pressure and pressure-gradient to get polar plots as functions of $\theta$:

$$\frac{p_1+p_2}{p}=\cos(k\Delta\cos\theta)$$

$$\frac{p_1-p_2}{\nabla p}=\frac{\sin(k\Delta\cos\theta)}{k\Delta\cos\theta} \quad (7)$$

Since the approximations (6) both err on the low side, we expect that the result of any such error will be a broadening of the polar response for both $p$ and $\nabla p$, so that the measured values will be slightly low for $\theta$ near 0 degrees, but quite accurate for $\theta$ near 90 degrees (see Fig. 7). In the final response of the wattmeter, where the product of those quantities appears, this broadening will be doubly evident, so that this constitutes a very delicate test. A further result of this phenomenon will be apparent shortly.

Diffraction

When a sound wave strikes and is reflected (or scattered) from an obstacle the effective pressure at any point is the sum of the pressures in the incident and reflected (or scattered) waves; hence the pressure at the face of a microphone always differs from the value of the pressure in the sound field in the absence of the microphone. At low frequencies, where the wave-length is large compared to the dimesions of the obstacle, reflection occurs only feebly and the effect is entirely negligible; it becomes noticeable only with rising frequency as the wavelength becomes comparable with the dimensions of the microphone and appreciable reflection beigns to appear. This phenomenon can give rise to pressures (for normal incidence) as much as twice that in the undisturbed free field, and for this reason the effect is sometimes called "pressure doubling." The effect decreases for oblique incidence and, indeed, the surface pressure falls below the free field pressure for incidence angles greater than 90 degrees. It must be emphatically stated that this is not an effect of diffraction, for it can occur at an infinite rigid plane surface, where there can be no question of diffraction. There is, however, an additional effect which is genuinely attributable to diffraction and this is the interference between wavelets originating at the sharp edges of the obstacle (fruitfully visualized in terms of Huygens' principle). The result of this is a component of pressure whose magnitude rises and falls as the frequency increases. For the case of normal incidence the virtual sources at the edge of the disk are all in phase and their effect is to create a "bright spot" at the center of the disk, with more complex circular patterns appearing as the frequency rises. When the incidence of the primary wave is oblique, there is a systematic variation in the phase of the sources at the edge and the effect is more complicated but its magnitude is diminshed. This effect can combine with the effect of pressure doubling to give a pressure at the face of a circular cylinder as much as 10 db greater than that in the undisturbed free field.

For microphones with simple geometrical configurations, if the frequency is not too high, both effects can be corrected electrically, although it is always preferable to avoid this as far as possible by making the microphones so small that the desired frequency range lies below the region in which this trouble makes its appearance. A compromise is usually demaned, however, between the theoretical requirement that the microphones be of small size to avoid diffraction problems and the practical necessity that they be large enough to work with; and this usually means that a certain amount of equalization must be provided.

The change of pressure arising from these effects at the face of a rigid plate of infinitesimal thickness is plotted in Fig. 8 for several angles of incidence as a function of $ka$. In Figs. 8 and 10, $p$ is the pressure at a point on the disk, $p_0$ is the pressure at the same point in the absence of the disk, $\theta$ is the angle of incidence, $a$ is the radius of the disk, and $k=\omega/c$. It is evident that at the frequencies in which we are interested the effect is small enough to manage. More interesting still is the fact that to the extent that such curves are applicable to our microphone, the polar response shows a sharpening for angles of incidence near $\theta=0$ degrees (see Fig. 10). This is just the opposite of the effect expected from the use of $(p_1+p_2)$ and $(p_1-p_2)$ to approximate $p$ and $\nabla u$! We now appreciate the advantage of using two pressure-sensitive devices to obtain the necessary pressure and velocity signals; for the error which this entails can be made to cancel the unavoidable errors due to diffraction. Although the effect of diffraction as shown here for a thin rigid plate is somewhat larger than the opposite effect given in Equation 7 and shown in Fig. 7, the fact is that the faces of our microphones are not quite rigid and the obstacle effects in our case are therefore somewhat less than those predicted for a rigid plate. Moreover, the obstacle effects are mainly confined to the "front" microphone and hence apply to $p_1$ alone, whereas the other effect affects both the sum and the difference signals. Thus we may expect that there can be a beneficial balancing of two opposite tendencies. And since the diffraction-pressure-doubling effect of "sharpening" is a function of $ka$, whereas the "broadening" due to the use of discrete points of measurement is a function of $k\Delta$, the design may be controlled to make the two effects cancel each other.

It is extremely interesting to note, moreover, that the obstacle effects affect most strongly the pressure at the center of the disk so that if the microphone is rendered insensitive at the center the obstacle effects are greatly reduced. This adds a further opportunity for adjustment of the polar response to obtain optimum cancellation of the aforementioned error. It should be pointed out that this feature of the condenser microphone of copending patent application, Serial No. 534,413, is in addition to the improved flatness of response to be realized when the units are actually used as microphones and not as elements of the acoustic wattmeter. Fig. 9 illustrates this in the voltage-frequency response of the wattmeter microphones. In this case, the "broadening" effect will predominate in the end.

It is an object of this invention to provide a general method for obtaining a measure of acoustic intensity from pressure signals alone.

A further object of this invention is to provide an acoustic wattmeter capable of giving a single pointer indication of acoustic intensity.

Other objects, advantages and improvements will become apparent from the following detailed description taken in connection with the accompanying drawings wherein:

Fig. 7 depicts graphs which indicate the broadening of polar response;

Fig. 8 graphically illustrates obstacle effects at the center of a rigid circular disk versus $ka$;

Fig. 9 graphically shows the voltage response versus frequency obtainable from the condenser microphone described in the aforementioned copending application; and Fig. 10 is a polar chart showing the expected microphone response for various angles of incidence.

Figure 1:
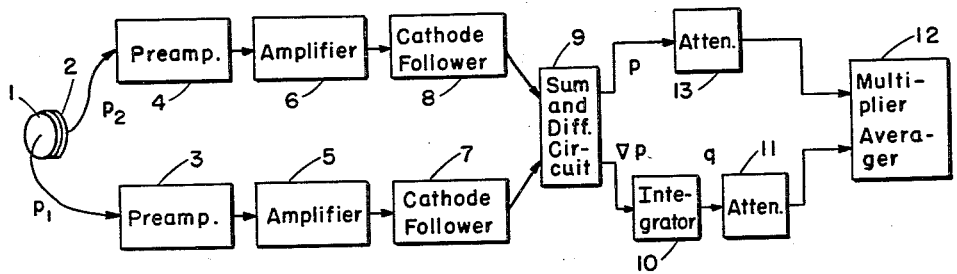
Fig. 1 is a block diagram of the invention indicating the arrangement of the major components.
Figure 2:
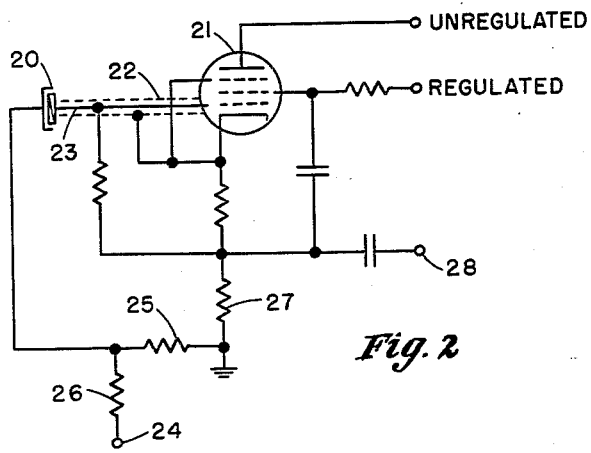
Fig. 2 is a schematic diagram of the preamplifier portion of the invention.
Figure 4:
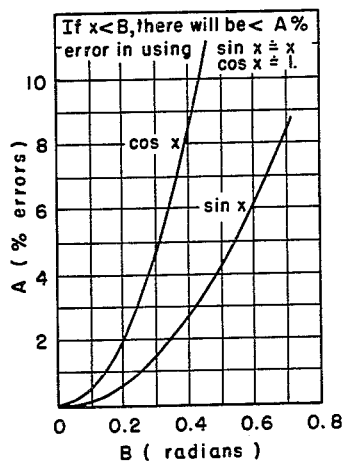
Fig. 4 is a graph indicating the percentage error entailed in using certain approximations.
Figure 3:
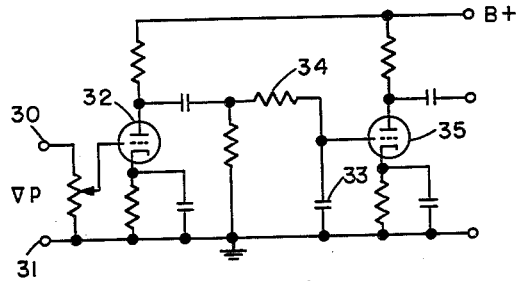
Fig. 3 is a schematic diagram of the intergrator portion of the invention.
Figure 6:
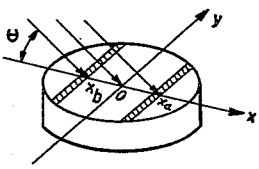
Fig. 6 is a perspective view of Fig. 5.
Figure 5:
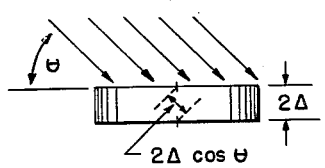
Fig. 5 depicts an on-edge view of a double condenser microphone with sensitive diaphragms on top and bottom.

Referring now to Fig. 1, there is shown a pair of identical condenser microphones 1, 2 of the type described in applicant's copending application, Serial No. 534,413. To minimize the distortion of the sound field which arises when a large microphone is introduced, the condenser microphone is of very small dimensions so that the obstacle effects associated with it are negligibly small and the pressure response is substantially uniform even when the sound is incident upon it at grazing incidence. The condenser microphone is polarized with high D. C. potential to increase the sensitivity and reduce distortion and is used as the source of small audio frequency E. M. F.'s corresponding electrically to fluctuations in pressure in the incident sound waves. The signal from microphone 1 is applied to the input of preamplifier 3 and the signal from microphone 2 is similarly applied to preamplifier 4. The function of the preamplifiers is to provide microphone bias and to serve as impedance transformers. It is desirable for two reasons that the input impedance of the preamplifiers be extremely high. First, the high internal impedance of the condenser microphone requires a terminating impedance large enough that the output of the microphone shall be as nearly as possible the open circuit voltage. Second, it is possible to reduce the tube and circuit noise elsewhere in the circuit to such an extent that the effective noise at the input will cause the most trouble and in this circuit the effect of thermal noise in the input resistance is less the higher the resistance. A preamplifier circuit suitable for use in the acoustic wattmeter is shown in Fig. 2 and is described in detail below. The output of the preamplifiers 3 and 4 are coupled respectively to the amplifiers 5 and 6. The amplifiers 5 and 6 may be of conservative design, i. e., ordinary resistance-capacitance coupled pentode stages with negative feedback. As a means of compensating for differences in the sensitivity of the two microphones and for differences in gain in the associated equipment, each of the amplifiers incorporates a potentiometer in its input circuit so that the input signal may be increased or decreased by adjusting the potentiometer. The adjustment is necessary in order that the difference signal, which represents the pressure gradient, may be set to a null value when the two microphones are simultaneously subjected to the same pressure. Where the sum and difference circuit 9 has a low input impedance, the amplifiers 5 and 6 may be terminated by coupling to cathode followers 7 and 8, respectively, which in turn are coupled to the sum and difference circuit 9. The latter circuit provides two outputs, one being the sum of the input signals and the other being the difference of the input signals. The summation signal $p$ is coupled through a range switching attenuator 13 to a multiplier averager 12. The difference signal $\nabla p$, which is the pressure gradient signal, is applied to integrator 10. A detailed description of the integrator circuit is given below and the circuit is schematically illustrated in Fig. 3. The output of the integrator 10 yields the particle velocity signal $q$ which is fed through a range switching attenuator 11 to the multiplier averager 12. The latter may be a dynamometer having both fixed and moving coils and designed to respond uniformly to signals of wide frequency range.

In Fig. 2 there is shown a schematic diagram of a suitable preamplifier connected to one of the condenser microphones. It is to be understood that an identical arrangement is utilized for the other microphone and preamplifier. Excessive stray capacitance between the microphone and the first stage would act as a voltage divider between the microphone and ground, reducing the signal; in order to minimize this effect the preamplifier tubes must be placed very near the microphone (and this means that they must be small in size to avoid disturbance of the sound field), and the first stage is designed for very low capacitance from grid to ground. A pentode tube is preferred to the triode in the preamplifier because of the pentode's higher gain and lower grid-to-plate capacitance, which in this case is effectively grid-to-ground capacitance. The cathode follower action of the circuit of Fig. 2 virtually eliminates the capacitance between grid and cathode because of a reversed Miller effect. As much as possible of the stray wiring capacitance external to the tube is deliberately placed in the position of a grid-to-cathode capacitance and the circuit is permitted to degenerate it to a smaller value. This is done by providing a conducting shield 22 around all the grid wiring 23 as far up to the microphone itself as is possible. The shield is connected to the cathode of tube 21 with the result that its potential follows that of the grid circuit so closely that there is scarcely any potential difference between the shield 22 and inner conductor 23. Thus, very little current flows between them and the effect of stray capacitance in the grid circuit is very small. The capacitance from cathode to ground is, of course, increased by this procedure, but since the output impedance of the cathode follower is quite low, its effect is negligible.

In order to calibrate the microphone 20, provision is made for the introduction at terminal 24 of a small known voltage into the grid circuit in series with the microphone. This is accomplished by means of an insert resistor 25 of very low value in conjunction with a somewhat larger resistance 26 which operates with the insert resistor 25 to provide an exactly known attenuation and at the same time presents to the calibrating source a suitable impedance.

The output of the cathode follower circuit of Fig. 2 is taken across cathode resistor 27 and a suitable terminal 28 is provided for that purpose.

Fig. 3 depicts an integrating circuit suitable for use in this invention. As previously stated, if the current through a capacitor is made proportional to the pressure gradient signal, the voltage which appears across the capacitor will be proportional to the particle velocity $q$ in the sound field at the point where the pressure gradient $p$, was measured. Since one of the outputs from the $\Delta$ sum and difference circuit 9 (Figure 1) is a pressure gradient voltage $\Delta p$, it is used to control a current generator which supplies a "pressure gradient current" to a capacitor. A current generator is simply a source of electrical energy having a very high internal impedance. The pressure gradient signal $\Delta p$ is applied through terminals 30 and 31 to grid of tube 32. Tube 32, together with the very large resistor 34, acts as a current generator and supplies a "pressure gradient current" to the capacitor 33. In order that the current through the capacitor 33 and resistor 34 be a faithful representation of the pressure gradient signal at the grid of tube 32, it is necessary, that the combination of the capacitance and resistance appear to the tube as a resistance load; this requires that at all significant frequencies the impedance of the capacitor 33 be small in comparison with the resistor 34. As this causes a very unfavorable voltage division, even at low frequencies where the capacitor reactance is relatively high, the voltage across capacitor 33 is amplified through the agency of tube 35.

It is to be understood that the circuits of Figs. 2 and 3 are merely exemplars of circuits which are suitable for use as components of the invention and that other circuits known in the electronics art may be adapted to serve as components therein. It is therefore to be understood that within the scope of the appended claims the invention may be practiced otherwise than as specifically described.

What is claimed is:

1. An acoustic wattmeter for measuring acoustic intensity comprising, a pair of tiny pressure-sensitive transducers separated in space by a short distance for obtaining electrical signals proportional to the instantaneous pressure on each of said transducers, means coupled to said transducers deriving a first output signal representing the summation of said electrical signals and deriving a second output signal representing the difference of said electrical signals, means for integrating said second output signal to derive a velocity signal, and multiplier averager means for multiplying and averaging said velocity signal and said first output signal whereby a measure of the acoustic intensity is obtained.

2. An acoustic wattmeter comprising, a pair of tiny pressure actuated transducers, each of said transducers providing an electrical output proportional to the instantaneous pressure acting thereon, amplifier means for amplifying the electrical output of each of said transducers, means coupled to the outputs of said amplifier means for deriving a summation signal representing the pressure at a point midway between said transducers and for deriving a difference signal representing the pressure-gradient at the said point, an integrator circuit for integrating said difference signal to derive a velocity signal, and multiplier means for obtaining the averaged product of said summation signal and said velocity signal whereby a measure of the acoustic intensity is obtained.

3. An acoustic wattmeter comprising a pair of tiny pressure actuated transducers, each of said transducers providing an electrical output proportional to the instantaneous pressure acting thereon, each of said transducers having an associated amplifier for amplifying said electrical output, means coupled to the outputs of the associated amplifiers for deriving a summation signal, said means also deriving a difference signal, integrator means for converting said difference signal to a velocity signal, said integrator means including a current generator having a capacitor connected in its output circuit, said difference signal being coupled to the input of said current generator whereby a velocity signal is obtained across said capacitor, and multiplier means for obtaining the product of said summation signal and said velocity signal whereby a measure of acoustic intensity is obtained.

No references cited.